Figure 1:
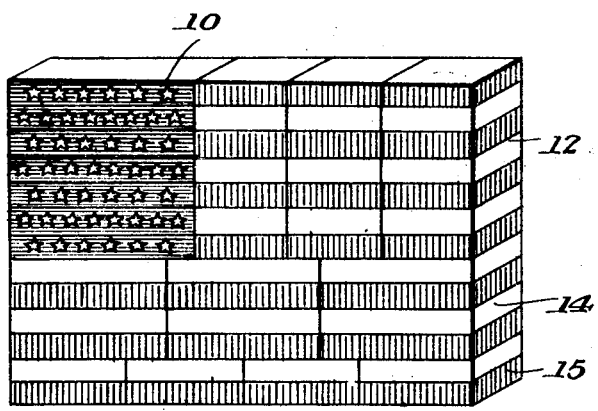
Figure 7:
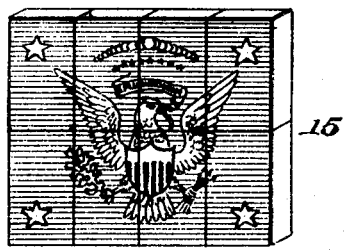

K. YONEMOTO.
PUZZLE.
APPLICATION FILED SEPT. 6, 1918.

1,339,251.

Patented May 4, 1920.
2 SHEETS—SHEET 1.

Inventor
Karoku Yonemoto
By Victor J. Evans
Attorney

Witnesses

K. YONEMOTO.
PUZZLE.
APPLICATION FILED SEPT. 6, 1918.

1,339,251.   Patented May 4, 1920.
2 SHEETS—SHEET 2.

Witnesses
Inventor
Karoku Yonemoto
By Victor J. Evans
Attorney

UNITED STATES PATENT OFFICE.

KAROKU YONEMOTO, OF HONOLULU, TERRITORY OF HAWAII.

PUZZLE.

1,339,251.    Specification of Letters Patent.    Patented May 4, 1920.

Application filed September 6, 1918. Serial No. 252,881.

*To all whom it may concern:*

Be it known that I, KAROKU YONEMOTO, citizen of the Empire of Japan, residing at Honolulu, in the county of Honolulu and Territory of Hawaii, have invented new and useful Improvements in Puzzles, of which the following is a specification.

This invention relates to puzzles and the object is to provide a series of blocks, preferably 48 in number, the edge portions of certain of the blocks being colored to indicate the stripes of an American flag and the edge portions of others being colored for building up the star field, the blocks of the star field being reversible and the stars on the reverse side being differently arranged so that a field of thirteen stars representing the colonies, or the original thirteen States may be presented.

A further object is to provide on the face of certain of the blocks representing the stripes of the flag, portions of the pictures, maps, or other representations, whereby the latter may be built up to produce certain independent results—for instance, the President's flag may be built up by utilizing the colored face portions of certain of the blocks of the American flag, eight of the blocks being utilized for this purpose.

With the foregoing and other objects in view, the invention consists in the novel construction, combination, and arrangement of elements hereinafter described and claimed.

Figure 2:
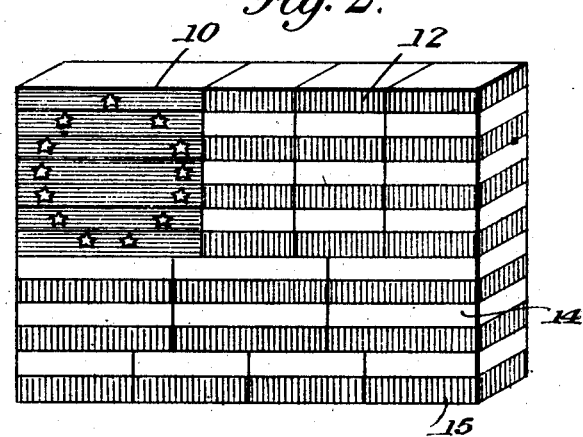
Figure 3:
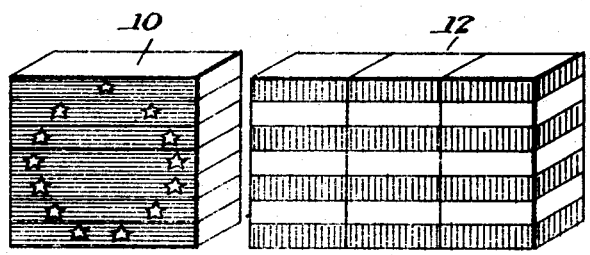
Figure 3:
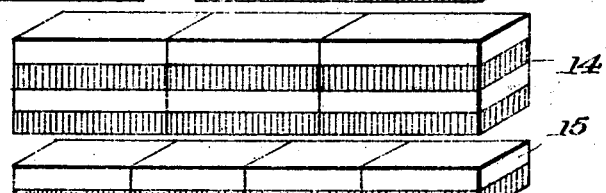
Figure 4:
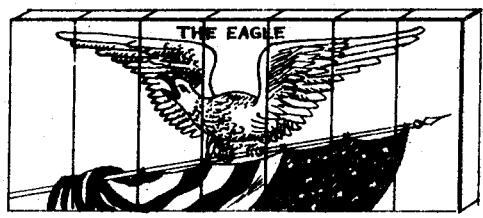
Figure 5:
Figure 8:
Figure 6:

In the drawings,

Figure 1 is a perspective view showing the blocks assembled for showing the American flag, Fig. 2 is a similar view, the blocks of the star field being reversed and showing the stars of the colonial flag, Fig. 3 shows the blocks separated into sets, the blocks of each set different in proportions from those of the other sets, Figs. 4, 5, 6 and 7 show the blocks of each set assembled, with the flat faces exposed, for forming separate designs, Fig. 8 shows the reverse of one of the blocks.

In carrying out my invention, I provide a series of 48 blocks divided into minor sets of different sizes. The blocks for forming the star field of the American flag or the colonial flag comprise a set designated 10 and the edge portions of these blocks carry stars, the stars on corresponding edge portions being arranged as shown in Fig. 1, in order to illustrate the American flag, and the stars on the opposite edges, being arranged as shown in Fig. 2, in order to illustrate a star field for a colonial flag.

The next set of blocks is designated 12, and the edge portions of these blocks, comprising certain of the rows, are colored, in order to indicate the red stripes, the blocks of the next row and of each alternate row being uncolored, to show the white or uncolored stripes, the remaining blocks forming the stripes of the flag comprise sets 14 and 15.

The face portions of the blocks comprising set 10 include on one side thereof portions of a representation termed "The flag and the eagle" this set comprising 7 blocks.

One face portion of each of the blocks of set 12 shows a section of a picture entitled "The Spirit of 76" 21 blocks being used in this section.

Set 14 comprises 12 blocks, and one face portion of each block includes a section of the map of the United States, the complete map being built up by properly assembling the blocks, as in the case of the blocks of the previous sets.

The series of blocks designated 15, 8 in number, each contains a representation of a portion of the President's flag and the complete flag is built up in the manner above indicated.

One of the blocks (Fig. 8), bears the representation of the Texas flag, and each of the 48 blocks carries on one side thereof the representation of the flag of one of the States of the Union.

From the foregoing it will be apparent that from a series of blocks showing a complete flag with a reversible star field, several individual flags, pictures, or maps may be produced by utilizing the appropriate blocks forming given sets. The face portions of the blocks are utilized in forming the individual representations, whereas the entire series of blocks comprising all of the sets are used for the American flag, the edge portions of the blocks being employed, as distinguished from the face portion. The blocks of each set are of a given size, but they differ in size from the blocks of the other sets.

What is claimed is:

In a puzzle, a series of blocks comprising a plurality of sets, certain of the blocks bearing representations on three surfaces, the blocks of each set being differently proportioned but of uniform thickness and the blocks of all of the sets with their edge portions exposed to view presenting a design, the respective sets of blocks similarly proportioned bearing on their flat faces the representation of a portion of a distinctive design which is rendered complete by assembling all of the blocks having the same proportions.

In testimony whereof I affix my signature.

KAROKU YONEMOTO.